No. 788,650. Patented May 2, 1905.

UNITED STATES PATENT OFFICE.

HENRY KNOTH, OF BIRMINGHAM, ALABAMA.

CONTINUOUS PROCESS OF MANUFACTURING STEEL.

SPECIFICATION forming part of Letters Patent No. 788,650, dated May 2, 1905.

Application filed July 13, 1903. Serial No. 165,371.

*To all whom it may concern:*

Be it known that I, HENRY KNOTH, a citizen of the United States, residing at Birmingham, in the county of Jefferson and State of Alabama, have invented certain new and useful Improvements in Continuous Processes of Manufacturing Steel, of which the following is a specification.

This invention has for its object an improvement on Letters Patent No. 712,389, granted to me October 28, 1902, covering a continuous process for manufacturing steel wherein the furnace contents are tapped into a ladle in which a portion of the steel is reserved and mixed with the molten pig metal with which the ladle is filled after its slag and the greater part of its steel contents have been poured off. The ladle, with its mixed charge, is then run back and charged into the same furnace or any other that may then be ready to receive it. It was designed by that process to eliminate the two principal points of loss in connection with the manufacture of steel by the open-hearth processes as usually practiced—*i. e.*, the length of time required to prepare the heats in the furnace for tapping and the scarcity and increased cost of scrap which was charged in large percentages with the pig metal. There still exists, however, in connection with this and prior processes a further point of waste and delay, which relates principally to the production and maintenance of a highly-basic slag capable of taking up the metalloids in the bath.

Where the entire treatment of the metal to be purified has been conducted in open-hearth furnaces, it has been proposed to improve upon the usual method of charging and heating the basic additions on the hearth by preparing a highly-oxidizing liquid basic slag in a cupola or auxiliary furnace, from which it is drawn off and introduced upon the molten metal on the hearth, producing an immediate reaction. It has also been proposed to retain a portion of the molten steel, with its slag covering, through which the molten pig metal to be purified for a second heat is poured, the impure slag being withdrawn from time to time and fresh basic additions introduced to maintain it in a condition capable of taking up the phosphorus and silicon in the bath. In connection with processes in which the metal is first treated in a Bessemer converter to reduce the silicon and some of the carbon and then finished in an open-hearth furnace where the phosphorus and remaining carbon are reduced this latter step has been expedited by preparing an artificial liquid basic slag, as in the first-mentioned process above.

My present invention contemplates an improvement in these processes in conjunction with my previously-described continuous process and may be described as follows: The unpurified pig metal, constituting the initial charge, when high in silicon may be subjected in a liquid state to an oxygen-yielding blast in an acid-lined vessel and the silicon and part of the carbon content of the metal reduced. The desiliconized metal is then introduced into an open-hearth furnace and there treated according to the usual methods and in the presence of a highly-basic slag to remove the phosphorus and reduce the carbon remaining in the bath to the desired point. If, however, the pig metal be sufficiently low in silicon, then this treatment in the converter will not be necessary for the successful operation of my process and the metal may be treated throughout in the open-hearth furnace. When the bath is ready to be tapped, it has heretofore been customary either to draw off the slag into a ladle or other receptacle and dump it as waste on the slag pile or to retain it in the furnace and prepare it by fresh basic additions to take up the metalloids in the succeeding charge of a continuous process. Obviously if the entire slag be thrown away much valuable basic material will be lost, and if it be retained in the furnace continuously its injurious action on the furnace-bottom, necessitating frequent repairs thereto and interrupting the continuity of continuous processes, will more than offset the advantages to be gained thereby.

According to my invention the slag which results from the treatment in an open-hearth furnace of pig or unpurified metal which is low in silica, either naturally or by reason of previous treatment in a converter, is drawn off with the molten steel into the same or a separate ladle or receptacle, from which it may be reintroduced back into the same or any other furnace so long as it retains its basic qualities.

Inasmuch as the slag will be basic up to the point where it contains sixteen per cent. silicon and twenty-five per cent. phosphoric acid, it is evident that the number of times it can be used is dependent directly on the amount of these elements it absorbs during the purification of a heat. Thus if the slag after the first heat contain five per cent. silicon and eight per cent. phosphoric acid it is clearly capable of being used three times with but little basic additions being made thereto to maintain its quantity. The lower the metals charged are in silicon and phosphorus the greater the saving and advantages of my process. Hence in many cases this economy will permit of the previous treatment of the unpurified metal in a converter before final treatment in the open-hearth furnace without increasing the cost of production.

All of the basic elements in the slag will be utilized by my process before it is thrown away, and in practice the slag is preferably recharged into the furnace while in a molten condition, so that reaction will begin at once with all the advantages attendant upon the use of an artificially-prepared liquid slag, but without the additional cost. While the slag is in the ladle, or after it has been recharged, fresh basic additions may be made thereto as desired. It is not required that the slag be used while hot, for it may be charged cold as a substitute for lime.

When this invention is incorporated as an improvement on my previous process, the various steps in the continuous operation thereof will be, first, preparing an initial heat of metal and slag and treating them in an open-hearth furnace; second, tapping the furnace contents into a ladle or other receptacle; third, pouring two-thirds of the purified metal into molds; fourth, recharging into the same or any other furnace this reserve of purified metal before, with, or after the unpurified metal which will complete the succeeding charge; fifth, the introduction of the reserve of slag back into the same or some other furnace. The unpurified metal added may be introduced hot or cold and may have been previously treated in a Bessemer converter. If this metal in a molten state and the reserve of steel are to be mixed in the ladle and introduced into a furnace together, the slag should be reserved in a separate ladle or conveyed direct to another furnace; but if the metals are charged separately the slag may be reserved in the ladle with the steel and introduced with it back into a furnace.

Though small portions of the slag may be withdrawn from time to time and basic additions made, so that the use of the slag may be continuous, I prefer to use it a few times with but small basic additions (or they may be entirely dispensed with) and throw it away as soon as it ceases to be basic, in which case limestone, cinder, &c., will be introduced with the succeeding charge, as in the case of an initial heat.

Not only does this invention give relief from the inconvenience of a slag pile too rapidly assuming troublesome proportions, but it saves great quantities of basic materials and, further, shortens the time of heats in the furnace.

By "unpurified" metal I mean such as has not been refined to the extent required for use as steel.

Having thus described my invention, what I claim as new, and desire to secure by Letters Patent, is—

1. The improvement in the art of manufacturing steel, which consists in reserving the slag from a heat outside of the furnace in which it was last used, introducing it in a molten condition into a furnace to purify a different charge of unpurified metal, and continuing to recharge the slag with succceeding charges of unpurified metal until its basic qualities have been substantially exhausted.

2. The improvement in the art of manufacturing steel, which consists in reserving the slag previously used in a furnace on the outside thereof, adding basic elements thereto, and charging said slag in a molten condition into any one of a number of furnaces then ready to receive it, introducing a new charge of unpurified metal into said furnace to be purified by said slag, and continuing the recharging of the said slag with succeeding charges of unpurified metal until its basic qualities are substantially exhausted.

3. The improvement in the art of manufacturing steel, which consists in subjecting the unpurified metal in a molten condition to the action of an oxidizing agent for reducing its silicon and carbon contents, completing its purification in an open-hearth furnace, reserving the slag formed thereon in the open-hearth furnace outside of said furnace, and introducing said slag in a molten condition with other metal, which has been partially desiliconized and decarburized, into an open-hearth furnace.

4. The improvement in the art of manufacturing steel by a continuous process, consisting in preparing the pig metal for use in the open-hearth furnaces by subjecting it to an oxidizing-blast to reduce its silicon and carbon contents, preparing an initial charge with said metal in a furnace, and reserving the slag formed on said bath after it has perfected the purification thereof without the said furnace, and utilizing it in a molten condition to purify succeeding charges of said pig metal in the same or other open-hearth furnaces into which said slag reserve is charged with other partly-purified metal.

5. The improvement in the art of manufacturing steel, which consists in drawing off the slag from a furnace when the heat therein has been purified and poured therefrom into a ladle or other receptacle, reserving the slag in a suitable receptacle until the furnace is ready for another charge to be purified, introducing a fresh charge of unpurified metal into the furnace, recharging the slag back into said furnace, and continuing the process until the slag is no longer basic.

In testimony whereof I affix my signature in presence of two witnesses.

HENRY KNOTH.

Witnesses:
H. V. PEACE,
W. J. KELLEHER.